United States Patent

[11] 3,592,158

| [72] | Inventor | John Gear<br>Huntington, N.Y. |
|---|---|---|
| [21] | Appl. No. | 981 |
| [22] | Filed | Jan. 6, 1970 |
| [45] | Patented | July 13, 1971 |
| [73] | Assignee | Atlantic Scientific Corporation<br>Plainview, N.Y. |

[54] FRICTIONLESS READOUT INSTRUMENT
6 Claims, 5 Drawing Figs.

[52] U.S. Cl.................................................. 116/129,
40/96, 116/116, 116/135, 226/97, 242/157,
308/10, 324/155
[51] Int. Cl.................................................. G09f 9/00
[50] Field of Search.................................... 116/135,
116; 40/32, 96, 142 A; 324/154, 155; 226/97;
308/10

[56] References Cited
UNITED STATES PATENTS

| 2,744,489 | 5/1956 | Gallant | 116/129 |
| 2,804,041 | 8/1957 | Neugass | 116/129 |
| 2,984,398 | 5/1961 | Chalmers | 226/95 |
| 3,125,985 | 3/1964 | Nallinger | 116/116 |
| 3,156,399 | 11/1964 | Wadey | 226/97 |
| 3,245,334 | 4/1966 | Long | 226/95 |
| 3,495,268 | 2/1970 | Hurst | 226/97 X |
| 3,502,049 | 3/1970 | Samet | 116/135 |

*Primary Examiner*—Louis J. Capozi
*Attorney*—Pennie, Edmonds, Morton, Taylor and Adams ABSTRACT: A frictionless readout device is disclosed in which guide means magnetically support a flexible magnetic tape for providing an indication corresponding to an input signal, characterized by extremely low power requirement and high precision. The strip is caused to move longitudinally across magnetic means generating a magnetic field of attractive power sufficient to cancel tension exerted longitudinally along the tape and thereby to suspend the tape in a fixed spatial relationship with the magnetic means.

PATENTED JUL 13 1971    3,592,158

INVENTOR
JOHN GEAR

BY Pennie, Edmonds, Morton,
Taylor & Adams
ATTORNEYS

FRICTIONLESS READOUT INSTRUMENT

BACKGROUND OF THE INVENTION

1. Field of the Invention

This invention has to do with tape readout instruments for displaying electrically representable variables. Instruments of this type are described in U. S. Pat. No. 3,125,985. Typically, such instruments comprise an endless tape or band inscribed at some point along its outer surface with indicia markings. Often, the indicia is simply the termination of a colored portion of the tape. The endless tape is usually guided at one end over a driving drum and at the other over a reversing roller arranged within the guide member and having a relatively small diameter in comparison with the driving drum. A panel portion is commonly provided having an opening therein and the tape is movable in back of the opening and is visible through the opening as the tape is displaced by the associated instrument or the like. Usually, also, the panel opening is elongated and has a scale or calibration along an edge thereof. The tape has an indicating column which is progressively visible through the elongated opening to cooperate with the scale for providing an indication of the displacement or position of the associated instrument.

2. Description of the Prior Art

Instruments of this type require a substantial amount of power to drive them in order to overcome the frictional losses inherent in the tape path. The amount of friction hindering the operation of tape-roller arrangements such as are used in the majority of flexible tape indicators is generally very high, requiring in many instances high torque drive motors in order to obtain adequate precision. In addition, tape position sensors and feedback arrangements have been employed, resulting in relatively large and heavy instruments which are expensive and consume substantial power. These factors prevent use of this type of instrument in many modern applications where low weight, small size and low power consumption are requirements of increasing importance.

SUMMARY OF THE INVENTION

The present invention is concerned with frictionless guide means for flexible tapes or bands, and particularly with a readout instrument in which tape responsive to a magnetic field may be suspended in spatial relationship to magnetic guide members. The resulting readout instrument is a much lighter, simpler, compact and less expensive indicating device with a considerably faster response time than readout instruments previously known. The frictionless guide means of the invention rid the tape movement of virtually all friction.

In accordance with the invention, frictionless guide means are provided for a flexible magnetic strip whereby the strip is caused to move longitudinally across magnetic means generating a magnetic field of attractive power sufficient to cancel the effect of tension exerted along the tape and thereby to suspend the tape in a fixed spatial relationship with the magnetic means.

The invention further provides a readout device for indicating a value corresponding to an input signal. The readout device includes a housing having a panel member with a longitudinally extending aperture therein. A flexible magnetic strip extends longitudinally adjacent to the aperture and is provided with indicia visible through the aperture. Magnetic means inside the housing magnetically attract and suspend the magnetic strip in a fixed spatial relationship to the housing. The strip is moved longitudinally by a drive member disposed in frictional contact with the strip such that the strip follows a path which is, at least in part, parallel and adjacent to the back surface of the panel member in the region of the aperture for exposing the indicator mark through the latter. In a preferred embodiment of the invention, the strip is disposed in part in substantially the same plane as the indicator indicia, thereby virtually eliminating parallax error.

BRIEF DESCRIPTION OF THE DRAWINGS

Specific embodiments of the invention will be described in connection with the attached drawings, in which.

DESCRIPTION OF THE PREFERRED EMBODIMENTS

Figure 1:
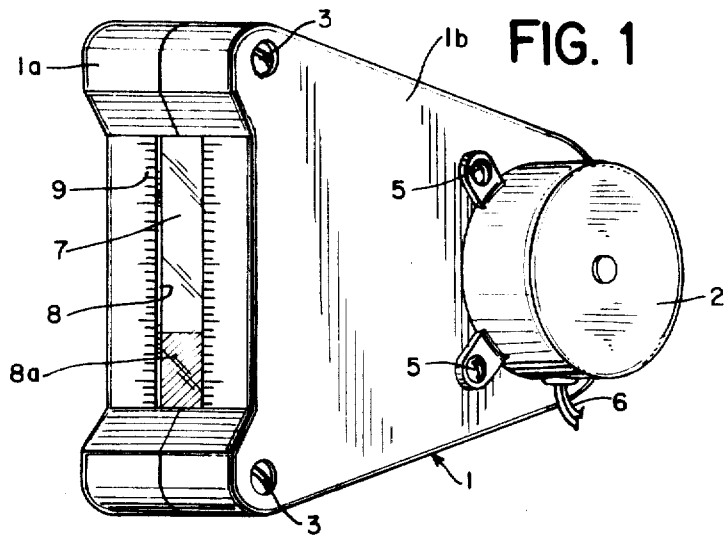
FIG. 1 is a perspective view of the indicator instrument of the invention.
Figure 2:
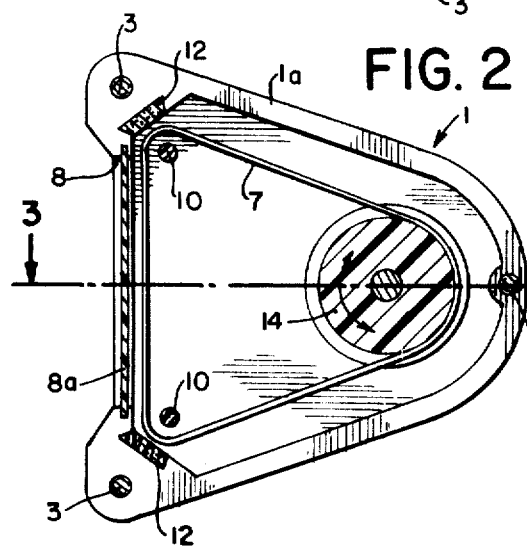
FIG. 2 is a cross-sectional view of the indicator instrument of FIG. 1 depicting the magnetically responsive tape and its orientation to the servomotor and guide pins.
Figure 3:
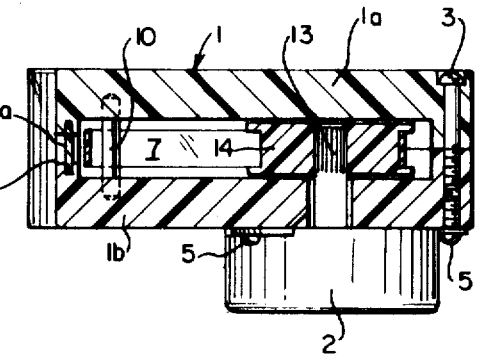
FIG. 3 is a horizontal cross-sectional view along lines 3–3 of the instrument of FIG. 2.

In the embodiment of the invention shown in FIGS. 1–3, the instrument is housed in a generally triangular housing 1 which may be constructed of two symmetrical pieces of molded plastic 1a and 1b. The two molded pieces 1a and 1b are fastened together by screws 3. An electromechanical movement 2 receives its electrical input through wires 6 and is fastened to the housing 1b by screws 5. The electromechanical movement, which may be a standard voltmeter or ammeter movement, rotates a shouldered drum 14 upon which a thin magnetic plastic tape 7 is disposed. Two guide pins 10 are provided about which the thin plastic tape 7 extends; however, the tape is held in a spatial relationship away from the guide pins by magnets 12. The magnets may be formed of any material capable of providing the magnetic field necessary to suspend the tape, for example, they may be Alinco magnets about one-sixteenth in. by one-eighth in. by one-half inch long. Virtually no mechanical friction is introduced then, at the guide pins, so that aside from friction in the electromechanical drive movement, the device is essentially frictionless.

The tape may be made of any thin, light, flexible material that can be magnetized. Common magnetic recording tape, one-quarter inch wide and on the order of 0.5 mil thick, may be used.

The dial face is formed by an aperture 8 which retains a transparent viewing window 8a across which a colored or otherwise visually differentiated portion of the tape 7 moves longitudinally, in the manner of mercury rising and falling in a thermometer tube with respect to calibrated indicia 9.

The magnets 12 are secured to the plastic body portions 1a and 1b of the instrument in dovetail fashion to provide permanent alignment. The shouldered drive wheel 14 is affixed to the electromechanical movement 2 by a knurled shaft 13. Preferably, means such as a setscrew (not shown) may be provided for adjusting the drive wheel with respect to the movement, to facilitate calibration.

Figure 4:
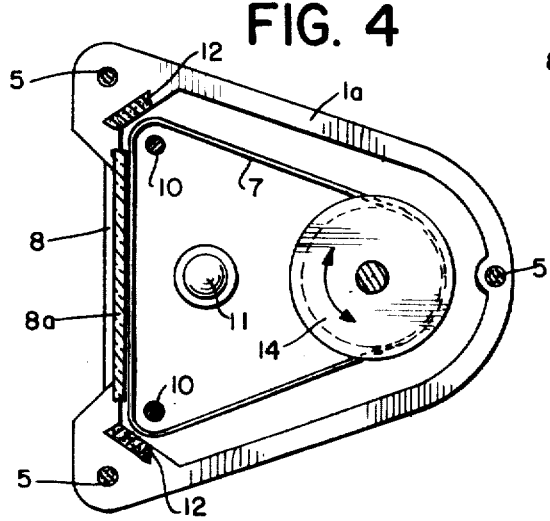
FIG. 4 is a cross-sectional view of another embodiment of the invention constructed in order to minimize parallax error and provide it with illumination of the dial face.
Figure 5:
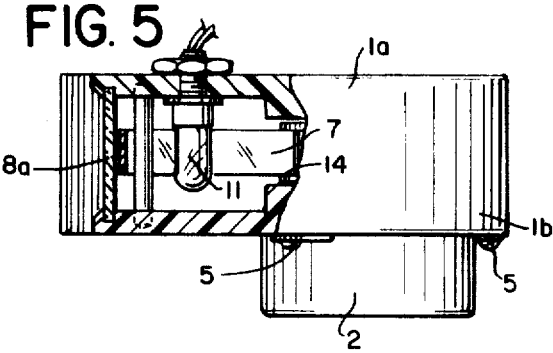
FIG. 5 is a top view, partly broken away of the indicator instrument illustrated in FIG. 4.

In another preferred embodiment of the invention illustrated in Fig. 4 and 5, the tape 7 is disposed in extremely close proximity to a glass viewing window 8a, so that the tape and the indicia of the aperture are substantially in the same plane, and parallax error is virtually eliminated. In the embodiment of the invention illustrated in FIGS. 4 and 5, a light bulb 11 is disposed behind the dial face in order to illuminate the exposed portion of the tape and the calibration markings or indicia. Lighting of this kind is particularly desirable when the indicia must be read under darkened conditions, as in the cockpit of an airplane at night.

In a further preferred embodiment of the invention, a single magnet is provided for suspending the magnetic tape or band, such that the sole means of support for the band are the shouldered drive wheel and the magnet. In this case, the dial face (which may be identical to aperture 8 of FIGS. 1–3) is disposed adjacent one of the two stands of the band lying between the drive number and the suspending magnet. The structural details of this embodiment of the invention may be substantially the same as those of the embodiment illustrated in FIGS. 1 through 3.

While the present invention has been described by reference to particular embodiments thereof, it is to be understood that this is by way of illustration of the principles involved and that those skilled in that art may modify or refine the arrangements and modes of operation described while remaining within the scope of the invention defined by the following claims.

I claim:

1. A readout device for providing an indication corresponding to an input signal, comprising: a housing, including a panel member having a longitudinally extending aperture therein; a flexible magnetic strip extending longitudinally adjacent to the aperture and provided with at least one index visible through the aperture, magnetic means in the housing for magnetically attracting and suspending the magnetic strip within the housing, and a drive member disposed in frictional contact with the magnetic strip for moving the strip along a path such that said index moves longitudinally with respect to the aperture.

2. A readout device as defined in claim 1 wherein there are two guide means disposed in back of the panel member adjacent to opposite ends of the aperture having surfaces with which the strip is juxtaposed.

3. A readout device as defined in claim 1 wherein said index is the boundary between two differently colored portions of said strip.

4. A readout device as defined in claim 1 wherein the tape is a thin plastic strip coated with a ferromagnetic material.

5. A readout device as defined in claim 3 including a light source disposed in back of said aperture for illuminating the strip and indicia visible therethrough.

6. A frictionless tape transport comprising: a housing; a thin flexible magnetic strip disposed therein defining a tape path; drive means frictionally engaging said strip for moving said strip along the path; and magnetic means in said housing for magnetically supporting said strip along the path free of frictional contact with the housing.